(12) United States Patent
Schneider

(10) Patent No.: US 9,234,648 B2
(45) Date of Patent: Jan. 12, 2016

(54) ILLUMINATION APPARATUS AND METHOD FOR THE GENERATION OF AN ILLUMINATION FIELD

(71) Applicant: SICK AG, Waldkirch (DE)

(72) Inventor: Florian Schneider, Waldkirch (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 14/455,033

(22) Filed: Aug. 8, 2014

(65) Prior Publication Data

US 2015/0049239 A1 Feb. 19, 2015

(30) Foreign Application Priority Data

Aug. 14, 2013 (DE) .......................... 10 2013 108 800

(51) Int. Cl.
| | |
|---|---|
| *F21V 7/00* | (2006.01) |
| *F21V 5/00* | (2015.01) |
| *F21V 5/04* | (2006.01) |
| *G06K 7/10* | (2006.01) |
| *H04N 5/225* | (2006.01) |
| *G02B 3/00* | (2006.01) |
| *G02B 19/00* | (2006.01) |

(52) U.S. Cl.
CPC ............... *F21V 7/0091* (2013.01); *F21V 5/004* (2013.01); *F21V 5/04* (2013.01); *G02B 3/0056* (2013.01); *G02B 19/0028* (2013.01); *G02B 19/0061* (2013.01); *G06K 7/1092* (2013.01); *G06K 7/10831* (2013.01); *H04N 5/2256* (2013.01)

(58) Field of Classification Search
CPC ............................ H04N 5/2256; H04N 5/2354
See application file for complete search history.

(56) References Cited

U.S. PATENT DOCUMENTS

| 5,813,743 A * | 9/1998 | Naka ................... F21S 48/1329 362/16 |
|---|---|---|
| 2007/0047232 A1 | 3/2007 | Kim et al. |
| 2009/0140048 A1 | 6/2009 | Yu et al. |
| 2010/0148688 A1 | 6/2010 | Hikmet et al. |
| 2010/0188018 A1 | 7/2010 | Salm |
| 2012/0127710 A1 | 5/2012 | Jurik et al. |
| 2015/0268481 A1* | 9/2015 | Strohmeier ............... G02B 3/12 348/294 |

FOREIGN PATENT DOCUMENTS

| DE | 102006024313 A1 | 11/2007 |
|---|---|---|
| DE | 102008014349 B4 | 10/2010 |

* cited by examiner

*Primary Examiner* — Tuan Ho
(74) *Attorney, Agent, or Firm* — Nath, Goldberg & Meyer; Jerald L. Meyer; Rury L. Grisham

(57) ABSTRACT

An illumination apparatus (10) for the generation of an illumination field (102) for an optoelectronic sensor (100) is provided which has at least one light source (12) and an illumination optics (14), in particular comprising a TIR lens (16) in order to guide the light of the light source (12) into the illumination field (102) in a directed manner, wherein the illumination optics (10) has a light entrance region (20), a light guidance region (22) having a jacket surface (24) and a light exit region (26) such that the light (28, 30) of the light source (12) is guided from the light entrance region (20) to the light exit region (26) in the illumination optics (14) by means of total reflection at the jacket surface (24). In this connection the illumination optics (10) has an adaptable optical beam forming element (18) at the light exit region (26) in order to set the light distribution of the irradiated light (28, 30). The beam forming element (18) has at least one elastic micro-lens field (32) having elastically deformable micro-lenses and a pressure element (26) in order to compress or to remove a load from the micro-lenses.

15 Claims, 2 Drawing Sheets

Figure 1:
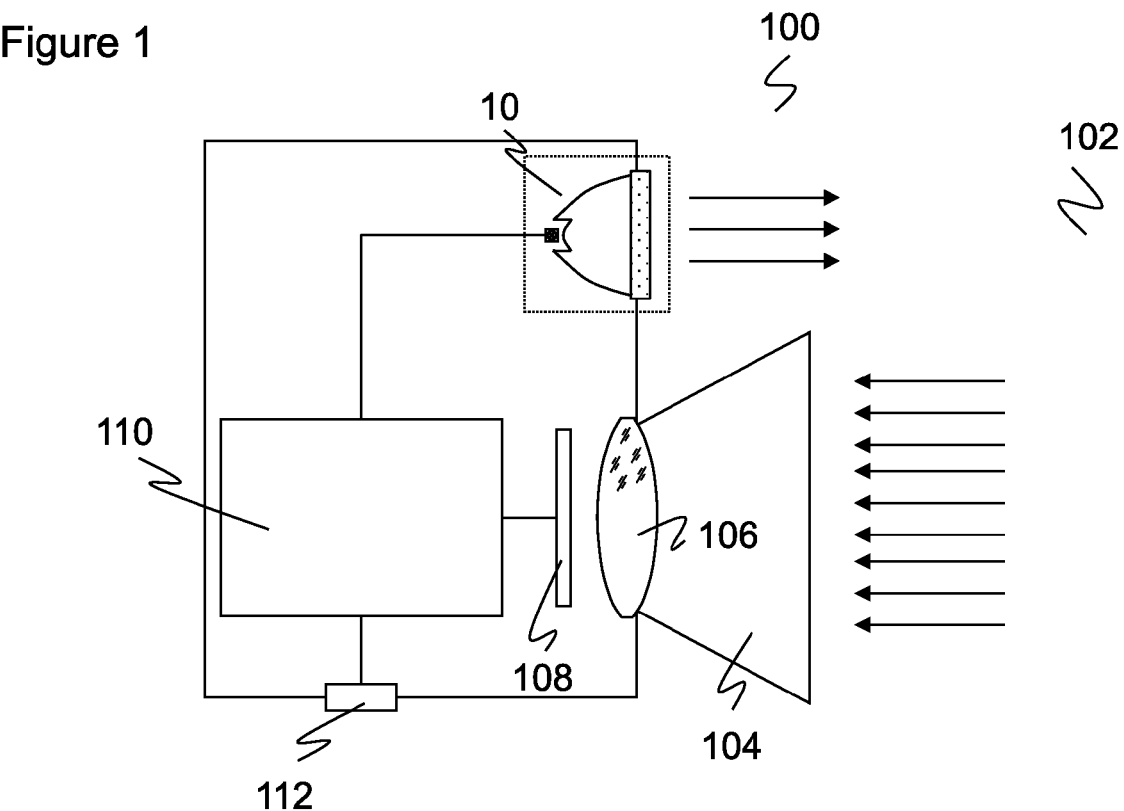

ILLUMINATION APPARATUS AND METHOD FOR THE GENERATION OF AN ILLUMINATION FIELD

The invention relates to an illumination apparatus and to a method for the generation of an illumination field in accordance with the preamble of claim 1 or claim 14 respectively.

Camera systems are frequently used for the inspection of objects or for the measurement of objects. In this respect images of the object are detected and are evaluated in accordance with the task by image processing methods. A further application of cameras is the reading of codes. Such camera-based code readers are increasingly taking over from the still widely used barcode scanners. Objects having the codes present thereon are recorded with the aid of an image sensor, the code regions are identified in the images and are then decoded. Camera-based code readers can easily also manage with different kinds of codes rather than one-dimensional barcodes, with the different kinds of codes being structured like a matrix code also in two dimensions and making available more information.

Such camera systems require an illumination in order to detect the objects to be inspected or to be measured and/or to detect the code to be read independent of ambient light or extraneous light. LEDs are frequently used in this respect as light sources. In comparison to the sometimes likewise used laser light sources, LEDs frequently have a more divergent irradiation characteristic and larger irradiation surfaces. Corresponding optics are used in order to still be able to guide their light towards the illumination field in a directed manner.

So-called TIR lenses (Total Internal Reflection) are known in the state of the art with regard to the efficient projection of the light. A TIR-lens has a geometry which ensures that the incident light is incident at sufficiently flat angles at the side surfaces in order to satisfy the current conditions for total reflection for the lens material. Thereby the light is guided in a manner similar as in a light guide. However, in addition to the mere forwarding of light, the exiting bunch of light has a desired beam shape due to the geometry of the TIR lens and in particular due to its jacket surface. TIR lenses are, for example, produced in an injection-molded process and are assembled to an illumination with an LED light source.

The initially mentioned camera systems are used in a large diversity of variants which differ in the resolution of the image sensor, but also with regard to their viewing fields and their working distance. Having regard to an efficient illumination, a matching TIR lens having a suitable illumination field must respectively be used. Thus, in some applications maximum working distances should be achieved for a given camera viewing field. In contrast to this, a larger overlap region of individual illumination units is rather required having regard to complicated surface properties of the detected objects, such as, the shine or the partial transparency. Thus, a large number of TIR lenses must be held available for the diversity of requirements which causes a corresponding demand in effort and cost for the development, production, storage and administration of the optical components. An adaptation of the illumination field in the field is not possible without an exchange of the illumination module.

The DE 10 2008 014 349 B4 discloses an optical sensor having a transmission optics in whose concentrator a light guidance is achieved by means of total reflection at the jacket surface. From the US 2006/0196944 A1 an illumination apparatus having an LED light source and a lens setting the angular range is known at whose outer jacket surface the light is guided by means of total reflection. The problem of the lacking adaptation possibilities for the arising illumination field is, however, not discussed in the state of the art.

For this reason it is the object of the invention to improve an illumination optics based on a TIR lens or on comparable illumination optics.

This object is satisfied by an illumination apparatus and by a method for the generation of an illumination field in accordance with claim 1 or claim 14 respectively. In this connection the invention starts from the underlying idea of guiding the light of a light source through an illumination optics, in particular through a TIR lens, whose geometry is designed in such a way that light present in the illumination optics through a light entrance region is incident in a sufficiently flat manner from the inside at the jacket surface and is thus forwarded and beam-shaped by means of total reflection prior to being projected in the direction of the illumination field via a light exit surface.

In order to now set optical properties and thereby the light distribution in the illumination field, such as for example, its extent or position, brightness or the divergence of the projected bunch of light, an adaptable optical beam forming element is now arranged in the illumination optics downstream from the light exit surface by means of which the divergence of the irradiated light can be set, whereby the setting can take place thereby that the beam forming element has at least one elastic micro-lens field having elastically deformable micro-lenses and a pressure element in order to compress the micro-lenses or to remove a load from the micro-lenses.

The invention has the advantage that the diversity of variants and thereby the demand in effort and cost in development, production and administration is reduced. Setting possibilities of the optical properties of the illumination apparatus in the field by the customer or the service are created without an exchange of the illumination apparatus.

The beam forming element has at least one elastic micro-lens field having elastically deformable micro-lenses and a pressure element in order to compress the micro-lenses or to remove a load from the micro-lenses. Thereby the optical properties of the micro-lenses are changed, in particular its focal length is changed. The two extreme states are quasi pressed flat, optically non-effective micro-lenses at the highest pressure and maximum optical influence at a complete removal of the load. Thereby a very simple setability can be obtained.

The light entrance region preferably has a recess in which the light source is arranged. The light source can thereby be practically inserted into the illumination optics in one piece, where the light entrance region then surrounds the light source over a large angular range. The illumination optics thereby receives the light of the source over a large angular range of irradiation angles. For this reason the irradiated light is guided into the illumination region in a directed manner also for a non-collimated light source having divergent irradiation characteristics, for example an LED having a large irradiation surface and/or a large irradiation angle.

The light entrance region is preferably configured at least partly convex. This convex part region even more preferably lies in the center. Thereby, an inner part of the light of the light source is beam-formed, which directly arrives at the light exit region without total reflection at the jacket surface.

The beam forming element preferably has at least two micro-lens fields movable laterally relative to one another. The lateral direction in this connection lies in a plane transverse to the direction of projection of the illumination apparatus. The movement does not necessarily have to take place exclusively laterally but can also comprise a component in the direction of projection. Thus, the micro-lenses are displaced within the beam cross-section of the exiting light and influence other beam cross-sections in dependence on the position through the lateral movement. Through the cooperation of displaced micro-lenses of the two micro-lens fields a particularly large influence is achieved with regard to the light distribution properties.

In a lateral arrangement of the micro-lens fields, the micro-lenses of the one micro-lens field and the micro-lenses of the other micro-lens field preferably lie directly on one another. Thereby a respective one micro-lens of the one micro-lens field and a micro-lens of the other micro-lens fields directly lying on one another interact with the projecting light. For example, this is a starting state in which the effects of these two micro-lenses compensate one another, according to which the beam forming element practically has no additional effect.

In a further lateral arrangement of the micro-lens fields the micro-lenses of the one micro-lens field and the micro-lenses of the other micro-lens field preferably lie displaced with respect to one another. Thereby, a matrix structure is effectively formed in which the micro-lenses of the one micro-lens field and the micro-lenses of the other micro-lens field are alternately arranged. For example, a state thereby results in which the exiting light is scattered first by the one micro-lens and then scattered even further by the second micro-lens.

A micro-lens field preferably has concave micro-lenses and a different micro-lens field preferably has convex micro-lenses. Having regard to a like micro-lens density and at least similar curvatures, the convex micro-lenses can then be arranged in different degrees in the concave micro-lenses in this way their effects can selectively compensate one another or increase one another.

A micro-lens field is preferably arranged fixed in position with respect to the light exit region and is in particular configured in one piece therewith. The light exit surface is in this connection preferably initially flat and not, as is the case in the state of the art, frequently convex with respect to the beam bunching. A micro-lens field is provided instead of this convex curvature. In a particularly preferred embodiment the micro-lens field is structured in the light exit surface, this means it is produced in one piece for example, in the same injection-molded process.

The beam forming element preferably has a diffractive optical element (DOE). The DOE is likewise variable, for example, in that different part regions of the DOE are displaced in the optical path or a plurality of part elements are displaced with respect to one another or in that the DOE is deformed.

In an advantageous embodiment a camera, in particular a camera-based code reader or a camera for the inspection of objects or for the measurement of objects, comprising an image sensor for the recording of image data, an evaluation unit for the reading of codes or for the determination of object properties from the image data and an illumination apparatus in accordance with the invention is provided. This camera offers the possibility of setting the illumination field in a variable manner and in this way to adapt this to various requirements and environmental conditions.

The method in accordance with the invention can be developed further in a similar manner and in this connection shows similar advantages. Such advantageous features are described by way of example, but not conclusively in the dependent claims dependent on the independent claims.

Figure 2:
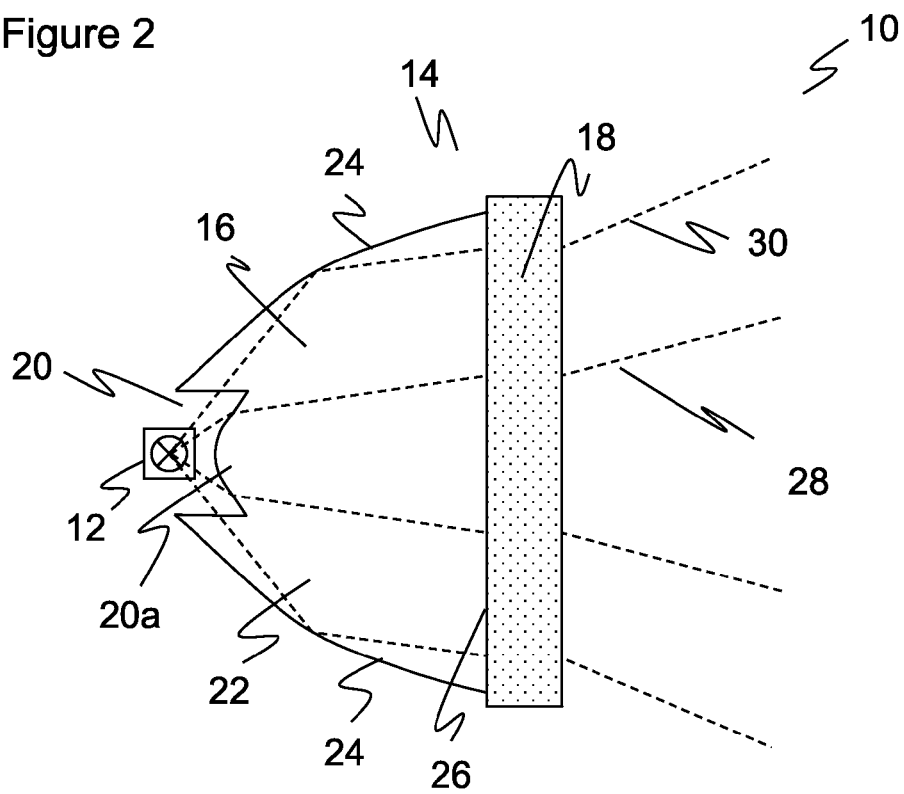
Figure 3A:
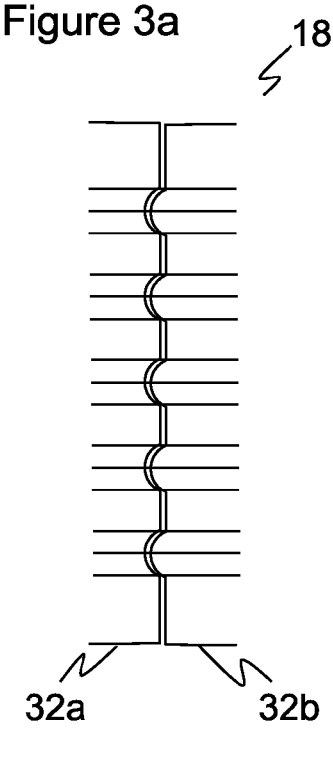
Figure 3B:
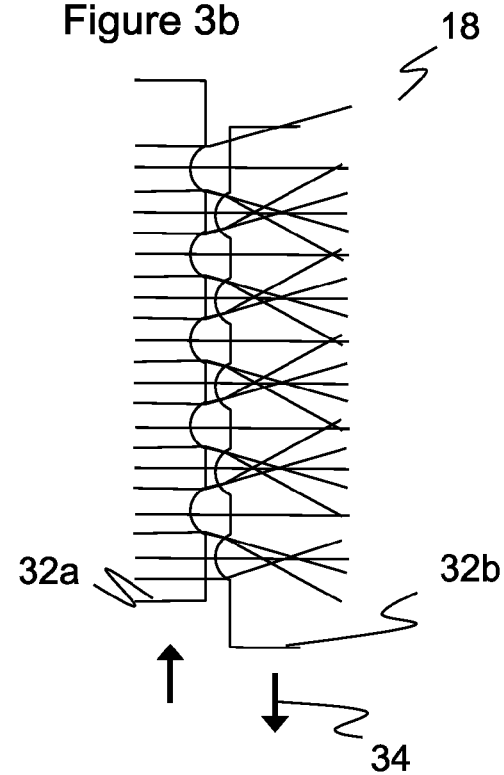
Figure 4A:
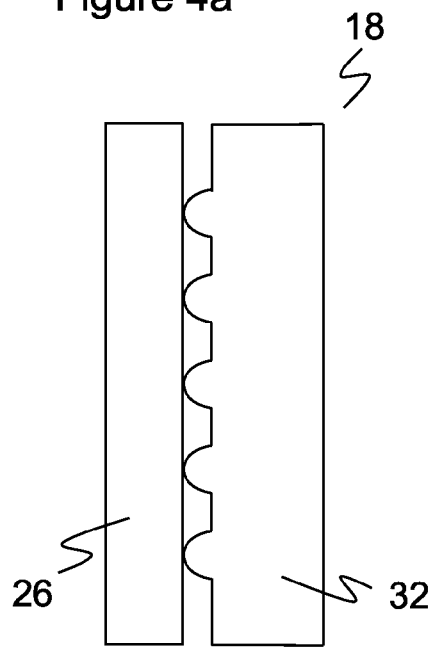
Figure 4B:
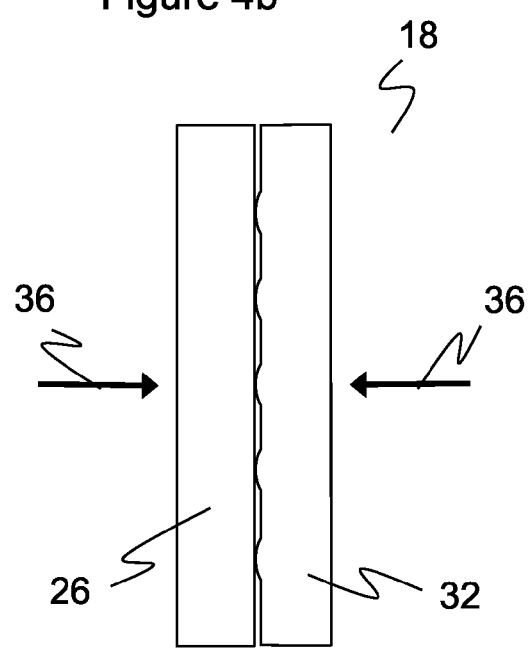

The invention will be described in the following in detail also with regard to further features and advantages by way of example by means of embodiments and with reference to the submitted drawing. The images of the drawing show in:

FIG. 1 a schematic sectional illustration of a camera having an illumination apparatus;

FIG. 2 a schematic sectional illustration of a settable illumination apparatus having light guidance by means of total reflection;

FIG. 3a a schematic illustration of an embodiment of a beam forming element of the illumination apparatus having micro-lens fields movable with respect to one another in a starting state;

FIG. 3b a schematic illustration of the beam forming element in accordance with FIG. 3a in a laterally displaced state;

FIG. 4a a schematic illustration of a further embodiment of a beam forming element of the illumination apparatus having an elastically deformable micro-lens field in a state where a load has been removed; and FIG. 4b a schematic illustration of the beam forming element in accordance with FIG. 4a in a compressed state.

FIG. 1 shows a schematic sectional illustration of a camera 100. The camera 100 can, for example, be used for the measurement of objects or for the inspection of objects, as well as for the detection of codes and the reading of their content. The camera 100 is equipped with an illumination apparatus 10 for the illumination of a recording region 102 of the camera 100 whose assembly will be described in the following in more detail.

The camera 100 detects light from a recording region 102 through a recording objective 104 in which only one illustrated lens 106 represents the recording optics. An image sensor 108, for example a CCD chip or a CMOS chip having a plurality of pixel elements arranged to a line or to a matrix generates image data of the recording region 102 and of the objects and code regions possibly present there and forwards these to an evaluation unit 110. The evaluation unit 110 is implemented at one digital component or at more digital components, for example, micro-processors, ASICs, FPGAs or the like which can also be completely or partly provided outside of the camera 100 and at the same time controls the illumination apparatus 10.

The image data are processed in the evaluation unit 110, for example, by way of preparation are filtered, smoothed, brightness-normalized, cut to certain regions or binarized. Then structures of interest are recognized and segmented, for example individual objects, lines or code regions. These structures are measured or are checked with respect to certain properties. In as far as codes should be read these are identified and decoded, this means that the information included in the codes is read out.

Data can be output at an output 112 of the camera 100 and indeed both evaluation results, such as read code information or determined dimensions and inspection results, as well as data in different processing stages, such as raw image data, pre-processed image data, identified objects or not yet decoded image data.

FIG. 2 shows the settable illumination apparatus 10 in a schematic sectional illustration. A light source 12, for example an LED, irradiates light into a comparably large angular region. An associated illumination optics 14 has a beam guiding element, illustrated by way of example as a TIR lens 16 and a beam forming element 18 arranged downstream thereof, in the present example this is purely schematically shown as a refractive or diffractive beam forming element. The TIR lens 16 comprises a light entrance region 20, a light guidance region 22 having a jacket surface 24 and a light exit region 26 at which the beam forming element 18 is arranged.

A recess is provided in the light entrance region 20 in the TIR lens 16. Thereby also laterally scattered light of the light source 12 arrives in the TIR lens 16. The light entrance region is convexly shaped in a central region 20a in order to bunch the inner part 28 of the incident light. In contrast to this the light exit region 26 is preferably flat, wherein a structuring can be provided at a comparatively small scale, as will be described in the following in more detail.

The light of the light source 12 thus arrives in the TIR lens 16 in as far as it is only coarsely irradiated in the direction of the illumination optics. Light irradiated backwardly from a practically completely undirected light source 12 can be thrown back into the TIR lens 16 by an additional non-illustrated reflector.

The inner part 28 of the bunch of light which was already irradiated in the desired direction with respect to the illumination field into the recording region 102 directly arrives at the light exit surface 26 in the TIR lens 16. In contrast to this the outer part 30 of the bunch of light is guided at the jacket surface 24 by means of total reflection and thus likewise arrives at the desired illumination field.

Without the beam forming element 18 the illumination field, as well as the light distribution within the illumination field would be rigid and would be fixedly predefined by the light source 12 as well as by the TIR lens 16 and their arrangement. If one would like to have a different illumination field and/or a different light distribution then one would have to exchange at least the TIR lens 16 and possibly the whole illumination apparatus 10. The settable beam forming element 18 now ensures a possibility of adaptation.

In a schematic illustration FIG. 3 shows an embodiment of the beam forming element 18 having micro-lens fields 32a-b movable with respect to one another. In this connection the micro-lens fields in FIG. 3a take on a starting position, in contrast to this, as indicated by the arrows 34, these take on a position laterally displaced thereto in FIG. 3b.

In the starting position in accordance with FIG. 3a two micro-lenses of the two micro-lens fields 32a-b each lie directly on one another or within one another and have no influence on the beam divergence. If now the micro-lens fields 32a-b and in this way the micro-lenses are displaced laterally with respect to one another, then the beam divergence is drastically increased, as is illustrated in FIG. 3b. In this manner a switch can be made between two states or an intermediate position having correspondingly changeable effects with respect to the beam divergence is selected. The behavior in these intermediate positions, however, does not necessarily lead to a beam deformation settable without steps, but rather possibly changes in an erratic manner or in a non-desired unexpected manner.

In FIG. 3 the micro-lenses of the one micro-lens field 32a are concave and the micro-lenses of the other micro-lens field 32b are convex. Thereby the micro-lenses can be pushed into one another in a matching way in the starting position.

This is only an advantageous example, as a likewise neutral starting position of the beam forming element 18 not having any influence on the light distribution and the beam divergence is not necessarily required. It is only important that the beam forming properties are changed on a mutual lateral displacement of the micro-lens fields.

The beam forming element 18 can be formed in a particularly simple manner when one of the micro-lens fields 32a is directly connected to the light exit region 26 and only the other micro-lens fields 32b is movable. A particularly simple manufacture is achieved when the micro-lens field 32a is configured in one piece with the TIR lens 16 in the light exit region 26.

In a schematic illustration FIG. 4 shows a further embodiment of the beam forming element 18 having an elastically deformable micro-lens field 32. FIG. 4a shows a state in which the micro-lenses are not subjected to a load, whereas the micro-lenses are pressed flatly in FIG. 4a.

In this embodiment the light exit region 26 is configured planar. The hyper-elastic micro-lens field 32 is deformed to a settable degree by the exertion of force in the vertical direction referred to with the arrows 36. Thereby the optical properties of the micro-lenses are changed, in particular the focal length is changed. Thus, in the position in accordance with FIG. 4a the focal length is at a maximum, whereas in the position in accordance with FIG. 4b the micro-lenses optically become nearly non-effective. Thereby the beam divergence is correspondingly reduced. The beam forming properties can be set without steps by means of intermediate positions.

The arrangement in accordance with FIG. 4 can also be reversed in that an elastic micro-lens field is then preferably connected to concave micro-lenses having the light exit region 26 or is configured in one piece and a planar pressure element acts thereon in a deformable manner.

It is further plausible to use at least one diffractive optical element (DOE), instead of the micro-lens fields movable with respect to one another or elastically refractive micro-lens fields.

The mechanical influence of force for the lateral displacement in accordance with FIG. 3 or the deformation in accordance with FIG. 4 can be achieved by arbitrary known actors, for example, by means of a manual screw mechanism, as well as by electromagnetic or pieco-electric drives and by artificial muscles.

What is claimed is:

1. An illumination apparatus for the generation of an illumination field for an optoelectronic sensor which has at least one light source and an illumination optics in order to guide the light of the light source into the illumination field in a directed manner, wherein the illumination optics has a light entrance region, a light guidance region having a jacket surface and a light exit region, such that the light of the light source is guided from the light entrance region to the light exit region in the illumination optics by means of total reflection at the jacket surface, wherein the illumination optics has an adaptable optical beam forming element at the light exit region in order to set the light distribution of the irradiated light, wherein the beam forming element has at least one elastic micro-lens field having elastically deformable micro-lenses and a pressure element in order to compress the micro-lenses or to remove a load from the micro-lenses.

2. The illumination apparatus in accordance with claim 1, wherein the illumination optics comprises a Total Internal Reflection lens.

3. The illumination apparatus in accordance with claim 1, wherein the light entrance region has a recess in which the light source is arranged.

4. The illumination apparatus in accordance with claim 1, wherein the light entrance region is configured at least partly convex.

5. The illumination apparatus in accordance with claim 1, wherein the beam forming element has at least two micro-lens fields laterally movable with respect to one another.

6. The illumination apparatus in accordance with claim 5, wherein the micro-lenses of the one micro-lens field and the micro-lenses of the other micro-lens field are disposed directly over one another in a lateral arrangement of the micro-lens fields.

7. The illumination apparatus in accordance with claim 5, wherein the micro-lenses of the one micro-lens field and the micro-lenses of the other micro-lens field are disposed displaced with respect to one another in a further lateral arrangement of the micro-lens fields.

8. The illumination apparatus in accordance with claim 5, wherein one micro-lens field has concave micro-lenses and a different micro-lens field has convex micro-lenses.

9. The illumination apparatus in accordance with claim 5, wherein a micro-lens field is arranged fixed in position with respect to the light exit region.

10. The illumination apparatus in accordance with claim 9, wherein the micro-lens field is arranged fixed in position with respect to the light exit region. and is configured in one piece therewith.

11. The illumination apparatus in accordance with claim 1, wherein the beam forming element has a diffractive optical element.

12. A camera, comprising an image sensor for the recording of image data, an evaluation unit for the reading of codes or for the determination of object properties from the image data and an illumination which has at least one light source and an illumination optics in order to guide the light of the light source into the illumination field in a directed manner, wherein the illumination optics has a light entrance region, a light guidance region having a jacket surface and a light exit region, such that the light of the light source is guided from the light entrance region to the light exit region in the illumination optics by means of total reflection at the jacket surface,
wherein the illumination optics has an adaptable optical beam forming element at the light exit region in order to set the light distribution of the irradiated light, wherein the beam forming element has at least one elastic micro-lens field having elastically deformable micro-lenses and a pressure element in order to compress the micro-lenses or to remove a load from the micro-lenses.

13. The camera in accordance with claim 12, wherein the camera is a camera-based code reader or a camera for the inspection of objects or for the measurement of objects.

14. A method for the generation of an illumination field for an optoelectronic sensor, wherein the light of a light source is guided in an illumination optics, from a light entrance region to a light exit region by means of total reflection at a jacket surface of a light guidance region,
wherein the light distribution of the irradiated light is set with the aid of an adaptable optical beam forming element at the light exit region, wherein the beam forming element has at least one elastic micro-lens field having elastically deformable micro-lenses and a pressure element in order to compress the micro-lenses or to remove a load from the micro-lenses.

15. The method in accordance with claim 14, wherein the illumination optics comprises a Total Internal Reflection lens.

* * * * *